United States Patent
Friedrich et al.

(10) Patent No.: US 12,065,065 B2
(45) Date of Patent: Aug. 20, 2024

(54) MOTOR VEHICLE SEAT

(71) Applicant: Bayerische Motoren Werke Aktiengesellschaft, Munich (DE)

(72) Inventors: Martin Friedrich, Munich (DE); Lukas Knorr, Munich (DE); Sophie Richter, Munich (DE); Barbara Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/595,412

(22) PCT Filed: May 15, 2020

(86) PCT No.: PCT/EP2020/063580
§ 371 (c)(1),
(2) Date: Nov. 16, 2021

(87) PCT Pub. No.: WO2020/234140
PCT Pub. Date: Nov. 26, 2020

(65) Prior Publication Data
US 2022/0194282 A1    Jun. 23, 2022

(30) Foreign Application Priority Data
May 23, 2019   (DE) ............... 10 2019 113 816.7

(51) Int. Cl.
*B60N 2/58*      (2006.01)
*B60N 2/806*     (2018.01)
(Continued)

(52) U.S. Cl.
CPC ............. *B60N 2/914* (2018.02); *B60N 2/806* (2018.02); *A47C 27/086* (2013.01); *B60N 2/58* (2013.01)

(58) Field of Classification Search
CPC .. B60N 2/914; B60N 2002/5808; B60N 2/58; B60N 2/60; A47C 27/086
See application file for complete search history.

(56) References Cited

U.S. PATENT DOCUMENTS 6,799,959 B1   10/2004   Tochimoto et al.
7,427,109 B2    9/2008   Embach et al.
(Continued)

FOREIGN PATENT DOCUMENTS

CN   109421566 A    3/2019
DE   41 16 836 A1   11/1992
(Continued)

OTHER PUBLICATIONS

International Search Report (PCT/ISA/210) issued in PCT Application No. PCT/EP2020/063580 dated Aug. 4, 2020 with English translation (five (5) pages).
(Continued)

*Primary Examiner* — Syed A Islam
(74) *Attorney, Agent, or Firm* — Crowell & Moring LLP

(57) ABSTRACT

For the purpose of simplified production of a motor vehicle seat which can be used in a versatile manner, with a seat part, a backrest and a headrest, the seat part and/or the backrest and/or the headrest have or has a number of chambers which are produced additively from an elastic material, particularly preferably silicone and/or a polyurethane, and which are in each case designed to be filled at least temporarily with a fluid.

14 Claims, 3 Drawing Sheets

(51) Int. Cl.
  *B60N 2/90* (2018.01)
  *A47C 27/08* (2006.01)

(56) References Cited

U.S. PATENT DOCUMENTS

| | | |
|---|---|---|
| 2005/0269858 A1 | 12/2005 | Leutert |
| 2005/0273936 A1* | 12/2005 | Chul ................... A47C 27/18 |
| | | 5/655.5 |
| 2008/0088159 A1 | 4/2008 | Grimm |
| 2011/0272993 A1 | 11/2011 | Kilincsoy et al. |
| 2018/0086238 A1* | 3/2018 | Onuma ................. B60N 2/976 |
| 2018/0170230 A1 | 6/2018 | Onuma et al. |
| 2018/0325264 A1* | 11/2018 | Gallagher ............ B60N 2/5685 |
| 2018/0339626 A1 | 11/2018 | Kojima et al. |
| 2019/0037969 A1 | 2/2019 | Busbee et al. |
| 2019/0061581 A1* | 2/2019 | White ................. B60N 2/5621 |
| 2019/0255972 A1 | 8/2019 | Breitweg et al. |

FOREIGN PATENT DOCUMENTS

| | | |
|---|---|---|
| DE | 198 00 078 A1 | 7/1999 |
| DE | 10 2004 060 027 A1 | 6/2006 |
| DE | 10 2005 024 774 A1 | 12/2006 |
| DE | 10 2008 019 045 A1 | 10/2009 |
| DE | 10 2009 016 050 A1 | 10/2010 |
| DE | 10 2016 004 645 A1 | 10/2017 |
| DE | 10 2016 221 507 A1 | 5/2018 |
| DE | 10 2016 224 885 A1 | 6/2018 |
| DE | 10 2017 129 451 A1 | 6/2018 |
| DE | 20 2017 103 162 U1 | 7/2018 |
| DE | 10 2018 204 461 A1 | 10/2018 |
| DE | 10 2018 208 007 A1 | 11/2018 |
| DE | 10 2018 120 660 A1 | 2/2019 |
| EP | 0 157 105 A2 | 10/1985 |
| EP | 3 047 760 A1 | 7/2016 |
| WO | WO 2004/009399 A1 | 1/2004 |

OTHER PUBLICATIONS

German-language Written Opinion (PCT/ISA/237) issued in PCT Application No. PCT/EP2020/063580 dated Aug. 4, 2020 (five (5) pages).

German-language Search Report issued in German Application No. 10 2019 113 816.7 dated Mar. 23, 2020 with partial English translation (10 pages).

English translation of Chinese-language Office Action issued in Chinese Application No. 202080034519.5 dated Apr. 21, 2023 (7 pages).

English translation Chinese-language Office Action issued in Chinese Appiication No. 202080034519.5 dated Nov. 1, 2023 (7 pages).

\* cited by examiner

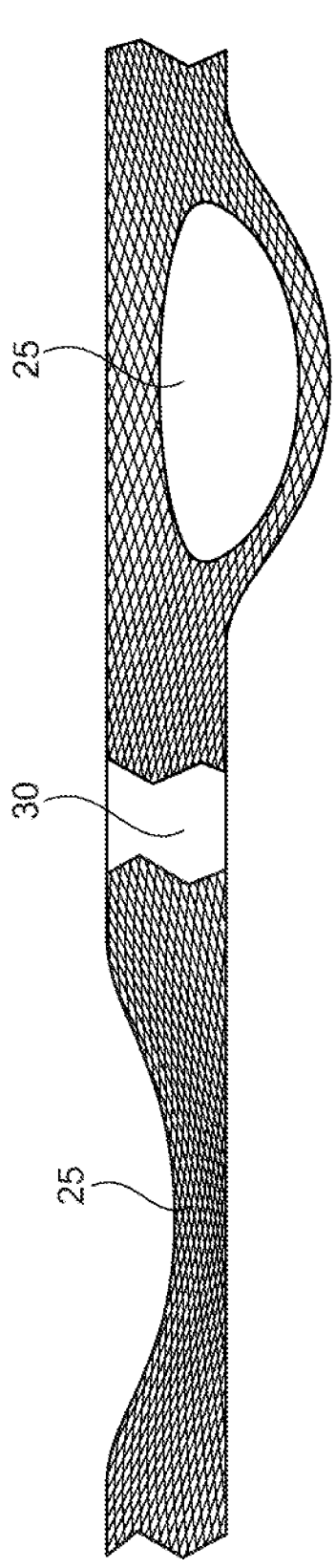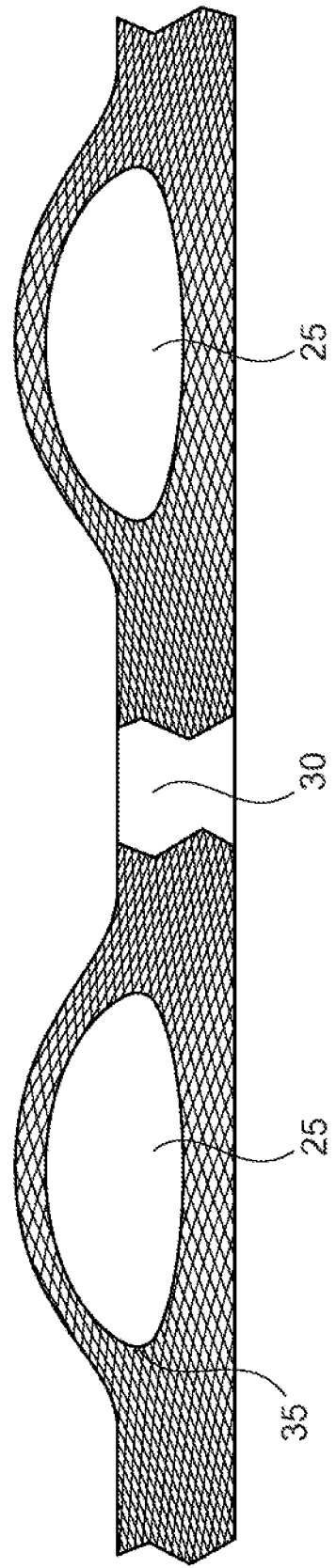

MOTOR VEHICLE SEAT

BACKGROUND AND SUMMARY OF THE INVENTION

The present invention relates to a motor vehicle seat.

A motor vehicle seat which has a seat part and a backrest which is adjustable in relation to the latter is known from DE 10 2018 204 461 A1.

From DE 10 2008 019 045 A1, it is known for vehicle seats to have cushions having different foam materials so as to configure different firmness zones of the vehicle seat.

From DE 10 2016 224 885 A1, it is known for selectively activatable pneumatic volume adjustment elements to be discretely distributed in the seat part and/or the backrest.

A vehicle seat having a massage function is known from DE 41 16 836 A1.

A support for a vehicle seat which has a spacer structure having tiers or layers which are disposed so as to be mutually parallel and connected by spacer threads; a fluid-tight casing for receiving the spacer structure, wherein the casing is composed of two material webs which are disposed so as to be mutually parallel and are connected to one another on the lateral peripheral regions thereof; and a connector by way of which the quantity of the fluid within the casing is able to be influenced, is known from DE 10 2009 016 050 A1.

A vehicle seat having sensors which are disposed in the seat part and/or the backrest is known from DE 10 2016 221 507 A1. Forces, pressures or movements exerted by a person seated on the vehicle seat are detected by the sensors so as to, based thereon, perform an adjustment of the seat part, the backrest or components situated in the vehicle seat.

Finally, the integration of an airbag in a vehicle seat, especially the backrest, is known from DE 10 2005 024 774 A1.

It is obvious that the motor vehicle seats known from the prior art, for fulfilling the functions set forth above, are of a disadvantageously complex construction.

It is an object of the present invention to provide technical means by way of which the mentioned disadvantage can be overcome.

This object is achieved by a motor vehicle seat according to the independent claim. Advantageous design embodiments are set forth in the dependent claims.

The motor vehicle seat according to the invention has a seat part, a backrest and a headrest, the mutual relative position of which can be configured so as to be fixed or variable. The seat part, the backrest and/or the headrest per se have/has a number of chambers which are additively produced from an elastic material, particularly preferably from silicone and/or a polyurethane, and can be filled at least temporarily with a fluid. The size of the chambers can be freely chosen such that an open-pore structure of the seat part, the backrest or the headrest, respectively, can in particular be achieved. Selective laser sintering (SLS), stereolithography (SLA) and polyjet methods by way of which the shape, the wall thickness and the mesh density of the components of the motor vehicle seat can, in particular, be produced are considered particularly suitable production methods.

A motor vehicle seat which possesses diverse adjustment possibilities which enhance the user comfort but can be produced in a comparatively uncomplicated manner is advantageously achieved by the present invention.

According to one preferred embodiment, at least one web which is produced during the additive manufacturing of the chambers and connects at least two adjacent chambers is provided. A high degree of versatility in the design of the motor vehicle seat according to the invention and simultaneously a simple production can advantageously be achieved as a result.

This applies even more so when a foam part which, during the additive manufacturing of the chambers, is connected to at least a proportion of the latter is provided.

The mechanical characteristics of the motor vehicle seat according to the invention are advantageously improved when the silicone and/or the polyurethane at discrete positions contain at least one additive, in particular a granulate.

The mechanical characteristics of the motor vehicle seat according to the invention are advantageously improved when the silicone and/or the polyurethane at discrete positions have different material thicknesses or material densities.

In principle, the silicone or polyurethane, respectively, which is provided in the motor vehicle seat according to the invention can be configured so as to be fluid-tight. According to one preferred embodiment, it can however also be provided that the silicone and/or the polyurethane at discrete positions is configured so as not to be fluid-tight. A ventilation function which is advantageous to a person utilizing the motor vehicle seat according to the invention can thus be achieved in a simple manner.

According to one further preferred embodiment, at least one means which conducts an electric current, in particular a conductor path or a cable, and is situated in or next to at least one chamber is provided. The means mentioned is preferably incorporated during the additive production of the chambers. As a result, electric consumers, in particular sensors, actuators and/or illumination means, which are situated in the motor vehicle seat, can advantageously be supplied with electric signals and/or power.

According to one additional preferred embodiment, at least one chamber is configured as an airbag. The complexity in terms of producing a motor vehicle seat can be advantageously further minimized as a result.

A detailed, non-prejudicial, in particular non-limiting, description of exemplary embodiments of the present invention with reference to the appended figures which are not to scale is offered hereunder.

BRIEF DESCRIPTION OF THE DRAWINGS

FIG. 2A shows a simplified sectional view of additively produced chambers of a motor vehicle seat according to an embodiment of the invention, the chambers being in a first operating position;

FIG. 2B shows chambers as an alternative to those in FIG. 2A in a second operating position.

DETAILED DESCRIPTION OF THE DRAWINGS

Figure 1A:
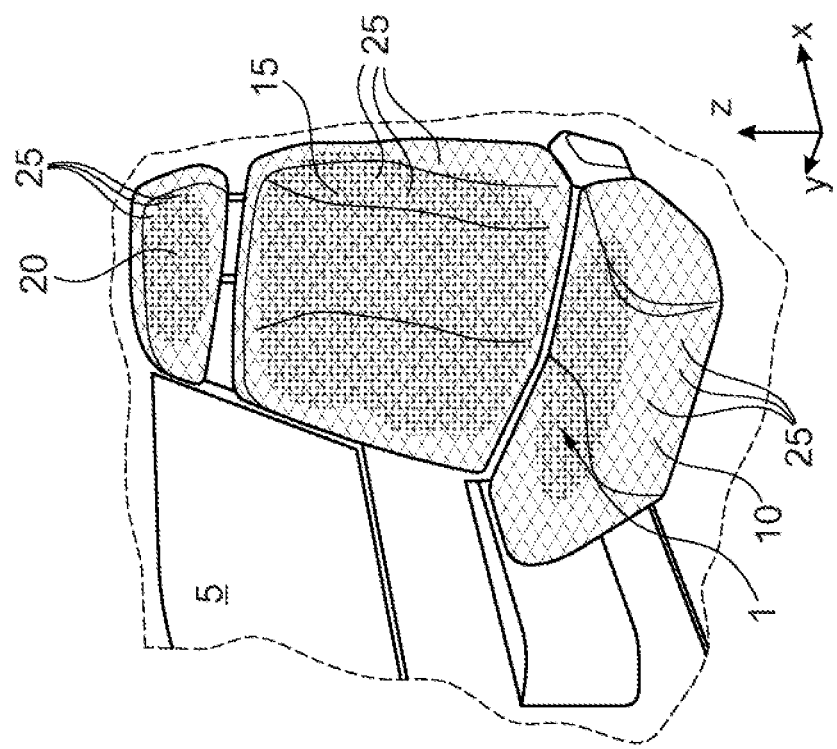
FIG. 1A shows a simplified perspective view of a motor vehicle seat according to an embodiment of the invention which is disposed in a motor vehicle and is in a first operating position.

In FIG. 1A, a motor vehicle seat 1 which is shown in a simplified perspective view is situated in a symbolically illustrated motor vehicle 5. The motor vehicle seat 1 in a manner known per se comprises a seat part 10, a backrest 15 and a headrest 20, all three being illustrated in a first operating position. The seat part 10, the backrest 15 and the headrest 20 have side bolsters known per se, the latter for reasons of clarity not being provided in more detail with reference signs. The seat part 10, the backrest 15 and the headrest 20 moreover have a number of chambers 25 which are additively produced from a silicone and of which, for reasons of clarity, only a few are provided with the reference sign. Alternatively, it can be provided that part or all of the chambers 25 are produced from a polyurethane.

Figure 1B:
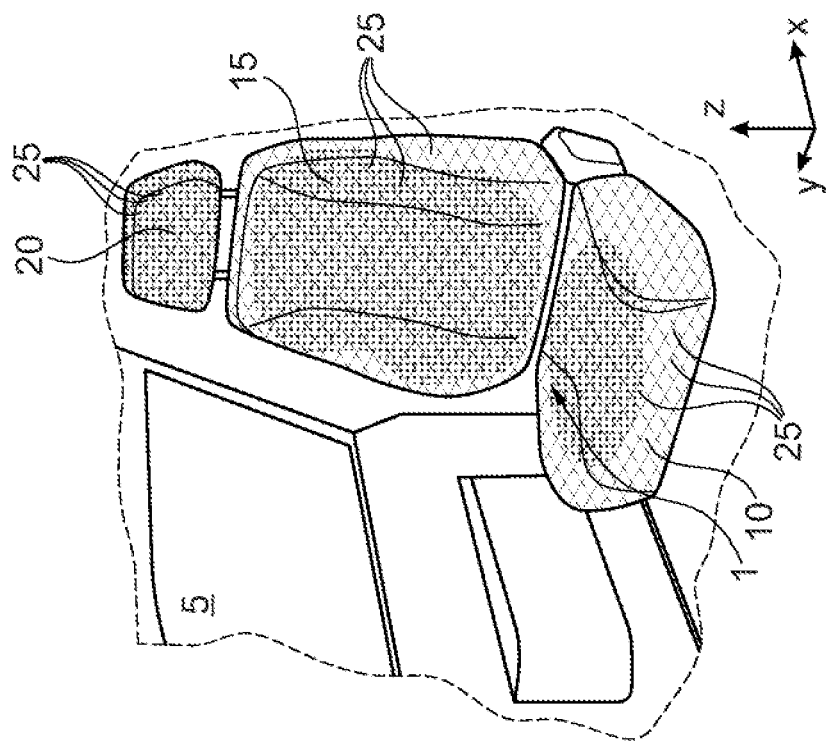
FIG. 1B shows the motor vehicle seat illustrated in FIG. 1A in a second operating position.

Each of the chambers 25, by way of an air supply not shown here, at any arbitrary time and for an arbitrary period can be filled partially or completely with air or any other desired fluid. For example, the second operating state shown in FIG. 1B can thus be achieved in that the chambers 25 of the seat part 10, of the backrest 15 and of the headrest 20, that in the travel direction of the motor vehicle 5 are situated on the right, in particular the chambers 25 situated in the respective side bolsters, are filled with more air than the chambers 25 that in the travel direction are situated on the left, and the motor vehicle seat 1 to this extent is more expansive in the right direction mentioned than in the left direction. It is however understood that the motor vehicle seat 1, as a result of specific chambers 25 being filled completely or partially with air, or emptied of air, respectively, in a defined manner, in one, several or all spatial directions x, y or z, respectively, can assume an entirely different shape than the shapes illustrated in FIGS. 1A and 1B. It is thus possible in particular to temporarily change the geometry of defined chambers, as a result of which a massage function of the motor vehicle seat 1 according to the invention can be created.

Two adjacent chambers 25 are illustrated in an exemplary manner in a sectional view in FIG. 2A, the chambers 25 being connected to one another by a common web 30 and being in a first operating position. The chamber 25 shown on the right in FIG. 2A is filled with air and specified in such a manner that the chamber 25 expands downward in FIG. 2A. In contrast, the chamber 25 illustrated on the left in FIG. 2A is completely evacuated in such a manner that a concavely shaped surface is configured in this region of the chamber 25. Consequently, the material which configures the chambers 25 is compressed in this region.

In FIG. 2B, two chambers 25 as an alternative to those in FIG. 2A are illustrated in a sectional view, the two alternative chambers 25 being filled with air in such a manner that the latter expand upward in FIG. 2B. To be seen in the chamber 25 illustrated on the left in FIG. 2B is a casing 35 which is provided from an additive and by which the mechanical characteristics of the chamber 25 can be influenced in a desired manner. The casing 35 can thus have a higher mechanical strength than the material surrounding the casing 35 such that the chamber 25 depicted on the left in FIG. 2B in temporal terms expands only after the chamber 25 illustrated on the right in FIG. 2B. Alternatively or additionally, it can be provided that the casing 35 is configured in an air-tight manner, while the chamber 25 depicted on the right is air-permeable.

The chambers 25 illustrated in FIGS. 2A and 2B, conjointly with the web 30 and the optional casing 35, are additively produced. As a result, it is understood that a desired number of chambers in any arbitrary spatial direction x, y, z can be produced in a simple manner. As a result, it is moreover easily possible for a desired geometry of the chambers 25 which are able to be completely or partially filled or emptied, respectively, to be generated, in particular by a suitable selection of materials and material thicknesses.

It is furthermore to be noted that the chambers 25 during the production process thereof or subsequently can be connected to further components of a motor vehicle seat 1, for example to a covering material having a foam or having a fabric, leather, or the like (all not shown).

Figure 3C:
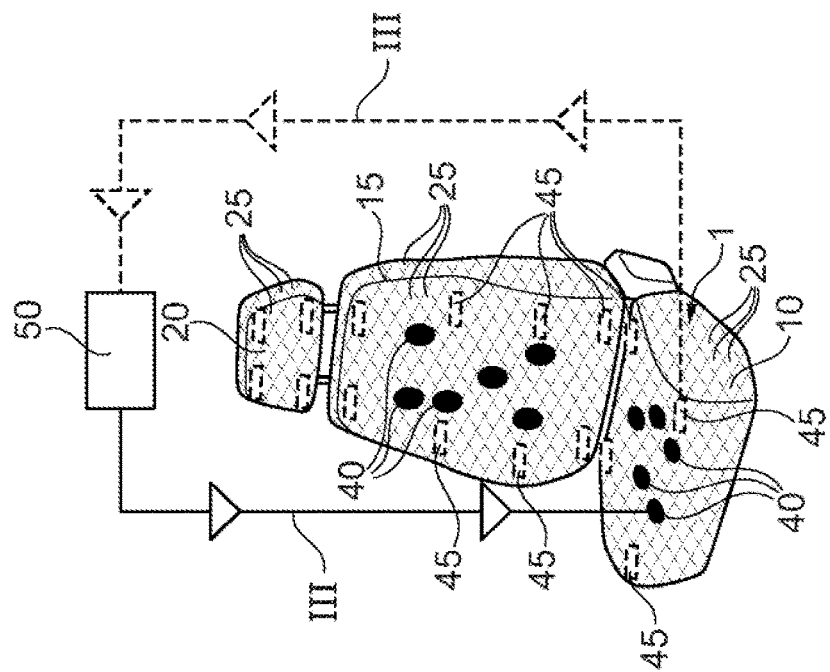
FIGS. 3A to 3C show, in each case, alternative embodiments of the motor vehicle seat according to the invention in a simplified perspective view.
Figure 3B:
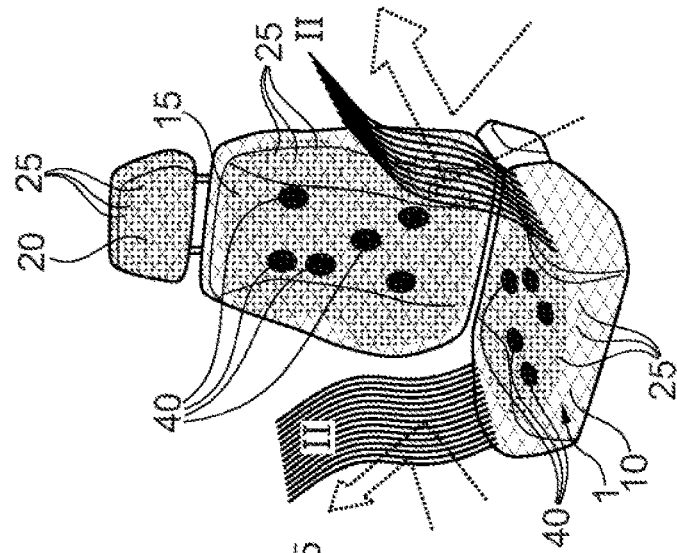
Figure 3A:
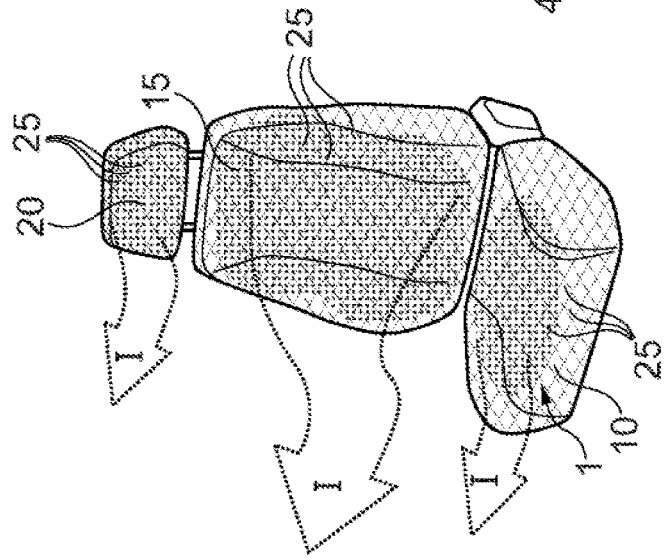

Shown in FIG. 3A is a motor vehicle seat 1 in a perspective view, a number of chambers 25 in the seat part 10, the backrest 15 and the headrest 20 being additively produced and disposed in a distributed manner in the motor vehicle seat 1. The chambers 25 are configured so as to be air-permeable such that fans (not shown) which are discretely distributed in the seat part 10, the backrest 15 and the headrest 20 can generate an air flow, symbolized by the arrows I, from within the motor vehicle seat 1 toward the outside. Alternatively or additionally, it is possible for air dispensed by an air-conditioning system (not shown here) of the motor vehicle 1 to be permitted to flow into the seat part 10, the backrest 15 and/or the headrest 20 in such a manner that the chambers 25 are filled with conditioned air, as a result of which a seat-climatization device is likewise created. The fans, as well as the electric conductors (not shown) which supply the fans with electric power and electric signals and are configured as conductor paths, are incorporated during the additive production of the seat part 10, the backrest 15 and the headrest 20.

A further embodiment of a motor vehicle seat 1 according to the invention is illustrated in FIG. 3B. In this motor vehicle seat 1, the ventilation function illustrated in FIG. 3A is provided only in the seat part 10, while the backrest 15 and the headrest are configured without ventilation. Furthermore provided in the seat part 10 and the backrest 15 are heating elements 40 of which only part are provided with reference signs for reasons of clarity. According to the present embodiment, it is provided that the upper region of the seat part 10 as that seat part on which a human body (not shown) rests during the usual use of the motor vehicle seat 1 is configured with air-impermeable chambers 25. Consequently, the effect of the heating elements 40 in this region is only by way of radiation and thermal conduction. At the same time, it is provided that the chambers 25 which are situated in the side bolsters of the seat part 10 are at least in part configured so as to be air-permeable. As a result, when using the heating elements 40 and fans, it is possible for heated air II to be permitted to flow out of the seat part 10 and accordingly on the side of the motor vehicle 1. The heating elements 40 as well as electric conductors (not shown) required therefor are also incorporated during the additive production of the seat part 10, the backrest 15 and the headrest 20.

A further alternative embodiment of a motor vehicle seat 1 according to the invention is shown in FIG. 3C. Apart from the heating elements 40 which have already been described with reference to FIG. 3B, a row of sensors 45 is situated in the seat part 10, the backrest 15 and the headrest 20. The sensors 45 and the heating elements 40 are operatively connected to a processor unit 50 situated in the motor vehicle 1, for example an on-board electronics unit which is known per se but not depicted here, as is symbolized by the arrows III. As a result, a closed-loop control circuit can be configured in which climatizing the motor vehicle seat 1 based on closed-loop control is able to be implemented in a manner known per se. The sensors 45 as well as electric conductors (not shown) required therefor are also incorporated during the additive production of the seat part 10, the backrest 15 and the headrest 20.

It is to be noted that sensors 45 which carry out a function different from that described above can also be used. It is thus possible for at least part of the sensors 45 to be configured as pressure sensors or biosensors for determining biometric data, the data of the sensors being emitted to the processor unit 50.

LIST OF REFERENCE SIGNS

- 1 Motor vehicle seat
- 5 Motor vehicle
- 10 Seat part
- 15 Backrest
- 20 Headrest
- 25 Chamber
- 30 Web
- 35 Casing
- 40 Heating element
- 45 Sensors
- 50 Processor unit
- I Air flow (cold)
- II Air flow (warm)
- III Operative connection
- x,y,z Axes of a vehicle-specific Cartesian coordinate system according to ISO 4130-1978

What is claimed is:

1. A motor vehicle seat, comprising:
   a seat part;
   a backrest; and
   a headrest, wherein
   the seat part, the backrest and/or the headrest has a number of chambers which are additively produced from an elastic material and, configured to be filled at least temporarily with a fluid,
   the elastic material is a silicone and/or a polyurethane, and
   the silicone and/or the polyurethane, at discrete positions, contains at least one granulate additive.

2. The motor vehicle seat according to claim 1, wherein at least one web is produced during the additive production of the chambers and connects at least two adjacent chambers.

3. The motor vehicle seat according to claim 1, wherein a foam part which, during the additive production of the chambers, is provided to be connected to at least a proportion of the chambers.

4. The motor vehicle seat according to claim 1, wherein the silicone and/or the polyurethane at discrete positions has different material thicknesses and/or material densities.

5. The motor vehicle seat according to claim 1, wherein the silicone and/or the polyurethane at discrete positions is configured so as not to be fluid-tight.

6. The motor vehicle seat according to claim 1, further comprising:
   means for conducting an electric current, said electric current conducting means being situated in or next to at least one chamber.

7. The motor vehicle seat according to claim 1, wherein at least one chamber is configured as an airbag.

8. A method of producing a motor vehicle seat, the method comprising:
   additively manufacturing from an elastic material a number of chambers of at least one of a seat part, back rest or headrest of the motor vehicle seat, wherein
   the number of chambers is configured to be filled at least temporarily with a fluid, wherein
   the elastic material is a silicone and/or a polyurethane, and
   the silicone and/or the polyurethane, at discrete positions, contains at least one granulate additive.

9. The method according to claim 8, wherein at least one web is produced during the additive manufacturing of the chambers and connects at least two adjacent chambers.

10. The method according to claim 8, wherein a foam part which, during the additive manufacturing of the chambers, is provided to be connected to at least a proportion of the chambers.

11. The method according to claim 8, wherein the silicone and/or the polyurethane at discrete positions has different material thicknesses and/or material densities.

12. The method according to claim 8, wherein the silicone and/or the polyurethane at discrete positions is configured so as not to be fluid-tight.

13. The method according to claim 8, wherein an electric current conductor is situated in or next to at least one chamber.

14. The method according to claim 8, wherein at least one chamber is configured as an airbag.

* * * * *